(No Model.)
A. H. SHERWOOD.
GARDEN SEED DRILL.
No. 277,620. Patented May 15, 1883.
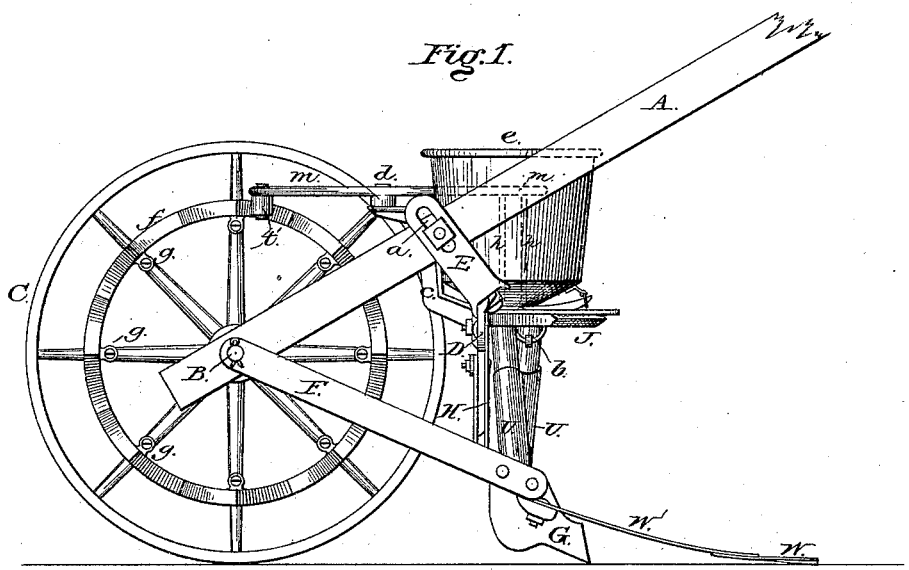
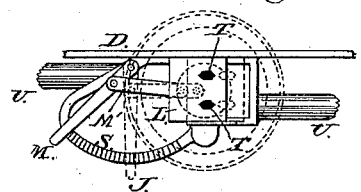
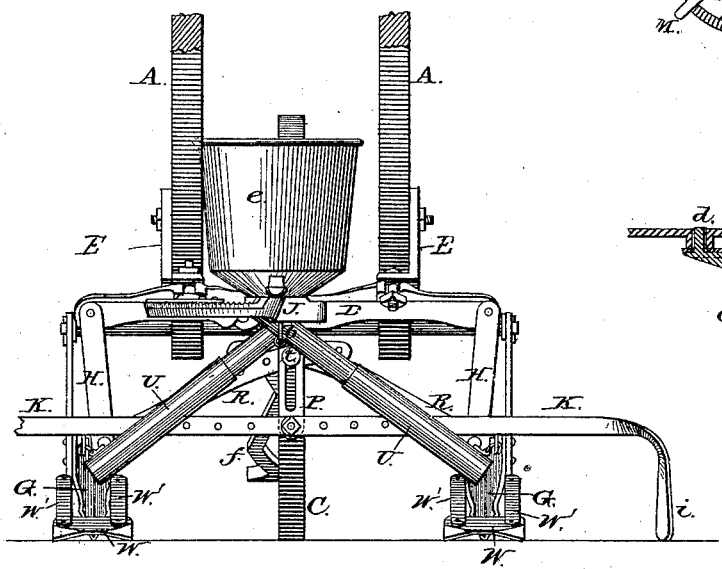
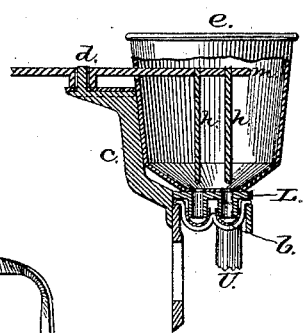
Witnesses:
John A. Ellis
J. F. Ackerly
Inventor:
Arthur H. Sherwood
By David A. Burr
Attorney.

United States Patent Office.

ARTHUR H. SHERWOOD, OF SOUTHPORT, CONNECTICUT.

GARDEN-SEED DRILL.

SPECIFICATION forming part of Letters Patent No. 277,620, dated May 15, 1883.

Application filed January 10, 1883. (No model.)

*To all whom it may concern:*

Be it known that I, ARTHUR H. SHERWOOD, of Southport, in the county of Fairfield and State of Connecticut, have invented a new and useful Improvement in Garden-Seed Drills; and I do hereby declare that the following is a full and exact description thereof, reference being had to the accompanying drawings, and to the letters of reference marked thereon, making a part of this specification.

My invention relates to garden-seed drills adapted for sowing two rows at a time.

It has for its object an automatic adjustment of the two seed-tubes to afford a constant connection between the hopper, its seed-apertures, and the drill-hoes or furrowers, irrespective of any change which may be made in the opening of the seed-slides or the width of the rows, an effective agitation of the seed in the hopper to insure its uniform delivery therefrom, and a simple attachment of markers to the seed-drill to facilitate field-planting of small grains.

It consists in the combination, with tubes whose lower ends are attached to the drill-hoes to deliver the seed into the furrow formed thereby, of upper tubular sections connected to the seed-slide, under the apertures therein, and which fit and telescope into the upper ends of the seed-tubes, whereby the connection between the apertures in the seed-slide and the tubes is constantly maintained, whatever may be the point to which the slide is moved.

It consists, also, in the connection of the hoes, to which the lower ends of the seed-tubes are attached, with a fixed central slotted adjusting-plate under the seed-hopper by means of diagonal brace-bars, whose outer ends are pivoted or jointed to the hoes, and whose inner ends, overlapping each other, are caught and confined by a single transverse bolt traversing in the slot of the fixed plate, so that by moving the bolt higher or lower in the slot the hoes are set closer or farther apart, a wider range of adjustment being permitted by means of a series of apertures drilled in the ends of the braces, through which to pass the bolt.

It consists, furthermore, of a detachable agitating device constructed of two rods or blades dependent within the hopper, over its seed-apertures, from the inner end of a horizontal lever, which, extending through a notch in the rim of the hopper from a vertical pivot upon a bracket between the hopper and the wheel of the machine, is made to vibrate horizontally upon said pivot by means of a cam-guide or equivalent on the wheel actuating the outer end of the lever.

In the accompanying drawings, Figure 1 is a side elevation of my improved garden-seed drill; Fig. 2, a rear elevation thereof; Fig. 3, a plan view of the seed-slide, the hopper being lifted off therefrom; Fig. 4, a vertical central section through the hopper and its supporting-arm and agitating device.

A A represent the wooden push bars or handles of the machine, connected together at their lower ends by a transverse rod, B, fixed therein, and which constitutes the axle of the machine, and at their upper ends by a cross-bar, completing the handle.

C is the wheel, rotating freely upon the axle centrally between the ends of the bars A A, being confined laterally by split pins passing through holes in the axle, or by other equivalent devices.

A transverse metallic bar or plate, D, is suspended beneath the handles A A, immediately in the rear of the wheel C, by means of plates E E, bolted to the outer sides of the handles, the bolts being passed through longitudinal slots *a* (see Fig. 1) in said plates to admit of an adjustment of the height of the handles. The ends of the axle B project laterally from the lower ends of the handles to support draw-bars F F, which are pivoted thereon, to extend back diagonally therefrom to the drill-hoes or furrowers G G of the machine. These are firmly secured to the lower ends of the draft-bars, upon the inner side thereof, immediately under the ends of the transverse bar D, from which they are suspended by bars H H, pivoted to the one and the other, to permit a lateral play of the hoes.

A metallic frame, J, is secured against the rear or outer face of the bar D in the rear of the wheel C. This frame is formed, as illustrated in Fig. 3, not only to provide a support for the seed-hopper, but to constitute also a horizontal bearing for the seed-slide L of the machine, and to furnish in the same plane a segmental rack, S, for the support of the lever M, operating the slide L. A slotted arm, P, dependent from the frame at right angles thereto, serves to support the inner ends of two brace-bars, R R, which extend thence diagonally to the hoes on either side. The upper inner ends of these brace-bars are each perforated with a series of apertures, and are superimposed against the arm P, to bring the apertures in register with each other and with the slot in the arm, so that a single bolt, t, may be passed through both bars and slot to confine the bars. By moving the bolt t up or down, the bars are made to draw in or force out the hoes, and when the latter are adjusted they are fixed in position by tightening up the nut on the bolt. By changing the bolt from one set of the apertures to another, the bars are lengthened or shortened for a wider adjustment of the hoes than can be obtained by the single movement of the bolt in the slot.

The seed-slide consists of a flat metallic plate, L, fitted upon the frame J, to slide freely thereon parallel with the transverse bar D. Its movement is regulated by means of the lever M, pivoted to the inner side of the frame, and whose free end, extending over the notched segment or rack S of the frame, is formed with a lug on its under side adapted to engage the notches in the rack. The lever is connected to the slide by means of a link, M', pivoted to the one and the other. A scale may be marked upon the rack to indicate either the quantity of seed of a given kind or the kind of seed in a given quantity which will be delivered in each position of the lever and slide. Two extended apertures, T T, are pierced in the seed-slide. (See Fig. 3.) These apertures may be either oblong or hexagonal in shape, and are encircled upon the under side of the slide, each by a tubular offset formed to serve as a spout. These spouts each fit into the upper end of a tube, U, loosely suspended by wires b b from the slide L, so as to be carried back and forth thereby. Each tube extending from the slide fits into and telescopes with the end of a second tube, whose lower end terminates over one of the drill-hoes, to which it is loosely attached by a wire. Each drill-hoe is formed with a rearward V-shaped extension or point, whose angle makes a V-shaped furrow in the soil, and at the same time forms a conduit for the seed from the spout to the furrow. A covering-plate, W, (or an equivalent roller,) follows each hoe to press back the earth upon the seed, being connected to the hoe by means of arms W' W'. A bracket, c, is secured to the inner side of the transverse bar D, to project near to the side of the rim of the wheel. This bracket terminates in a pin, d, which serves the double purpose, first, of receiving and confining an arm from the seed-hopper e of the machine, said arm being perforated to slip over the pin, and, second, as a pivot for the lever m of the agitating device. The bottom of the hopper e rests upon suitable supports on the frame J, immediately over the slide L, and is perforated with two oblong or hexagonal apertures adapted to register with those in the slide L when the slide is thrown back, and to be closed thereby when it is thrown forward, the intermediate movement and positions of the slide serving to regulate with precision the size of the opening left for the discharge of the seed.

The agitating-lever m is pivoted upon the bracket-pin d to vibrate horizontally thereon. Its outer arm is fitted with two friction-rollers, adapted to embrace between them an annular cam-guide, f, secured to the side of the wheel C upon offsets g g, (see Fig. 1,) projecting from its spokes concentric with its rim, and to which the guide is fastened by screws. (See Fig. 1.) The inner end of the lever projects into the hopper through a notch in its upper rim, and carries two rods or blades, h h, which depend therefrom within a hopper immediately over each of its seed-apertures. The rotation of the wheel carrying the cam-guide serves to maintain a constant vibration of the lever and rods, and so keep the seed in the hopper loose and free to pass down into the openings.

Markers i i may be attached to the machine by means of a bolt (see Fig. 2) led through an aperture in the lower end of the slotted arm P, under the seed-hopper, which shall engage the inner ends, K K, of the rods carrying the markers. These rods k k rest upon the draft-bars F F, next to the hoes, and are confined thereon between the bars H H and braces R R. They extend out far enough to mark one-half the proper distance between the rows when a row is being sown, or when the machine is following back in its own track. A series of holes formed in the inner ends of the marker-rods permit them to be extended or retracted to suit the width required between the rows.

The seed-hopper may be readily divided transversely into two compartments, leaving one of the agitating-rods and one seeding-aperture in each.

The oscillating arm or lever m and the hopper e may each in turn be readily lifted off of the pin d for removal from the machine.

In the use of the machine the handles are set, by means of the slotted plates E E, to the most convenient angle or height, and the drill-hoes are adjusted to the proper distance apart, first by means of the apertures in the inner ends of the brace-bars R R, and again by means of an adjustment in the slotted arm P of the bolt passing through said apertures. The seed-apertures in the bottom of the hopper are likewise adjusted to suit the quantity and character of the seed to be sown by a movement of the lever M, the proper position of the lever being readily determined by reference to the scale on the segmental rack which secures the lever. The telescopic seed-tubes will automatically accommodate themselves to all of these adjustments without disconnection.

I claim as my invention—

1. The combination, in a garden-seed drill, with its seed-hoppers e, drill-hoes G G, and extension-tubes U U, of the pivoted suspension-bars H H, pivoted brace-bars R R, slotted arm P, and bolt t, substantially in the manner and for the purpose herein set forth.

2. The combination, in a garden-seed drill, with its handles A A, an adjustable transverse bar, D, and a detachable hopper, e, of a frame, J, attached to the bar D, a seed-slide, L, fitted to move upon said frame under the hopper, and thereby adjust the apertures to seeds of different size, a segmental rack, S, formed in one with the frame, a lever, M, pivoted to the frame to move over the rack, and a link, M', connecting the lever and slide, all substantially in the manner and for the purpose herein set forth.

3. The combination, with the handles A A, axle B, wheel C, and transverse bar D, in a garden-seed drill, of the bracket c, pin d, and detachable hopper e, and of the detachable vibrating lever m, actuated by the engagement of friction-rollers at its outer end with a cam-guide, f, or its equivalent, on the face of the wheel, and from which depend agitating rods or blades h h, within the hopper e, all substantially in the manner and for the purpose herein set forth.

In testimony whereof I have signed my name to this specification in the presence of two subscribing witnesses.

ARTHUR H. SHERWOOD.

Witnesses:
WM. F. ELWOOD,
L. F. SHERWOOD.